United States Patent
Seliga

[19]

[11] Patent Number: 6,139,113
[45] Date of Patent: Oct. 31, 2000

[54] VEHICLE RIM ASSEMBLY

[76] Inventor: Lynne M. Seliga, 5 Old Cranberry, Hazleton, Pa. 18201

[21] Appl. No.: 08/955,498

[22] Filed: Oct. 22, 1997

Related U.S. Application Data

[63] Continuation-in-part of application No. 08/676,715, Jul. 8, 1996, abandoned.

[51] Int. Cl.[7] ................................................. F16B 37/08
[52] U.S. Cl. ..................... 301/35.62; 301/111; 411/432
[58] Field of Search .......................... 301/35.54, 35.57, 301/35.62, 105.1, 111, 114; 411/347, 349, 432, 433, 532

[56] References Cited

U.S. PATENT DOCUMENTS

| | | | |
|---|---|---|---|
| 1,863,496 | 6/1932 | Mooney | 301/35.62 |
| 1,919,812 | 7/1933 | Swanson | 411/402 |
| 2,101,938 | 12/1937 | Giberson . | |
| 2,407,314 | 9/1946 | Mason | 10/86 |
| 2,478,972 | 8/1949 | Luce | 411/347 X |
| 2,591,631 | 4/1952 | Stanitski | 301/9 |
| 3,465,803 | 9/1969 | Ernest et al. | 411/349 |
| 5,042,880 | 8/1991 | Garuti et al. | 301/35.62 |

*Primary Examiner*—Russell D. Stormer
*Attorney, Agent, or Firm*—Anthony J. Dixon

[57] ABSTRACT

A vehicle rim and lug nut assembly wherein a series of circumferentially placed lug nuts are disposed about a vehicle rim, each lug nut encased in an inner cylinder which is itself contained in an outer cylinder mounted to the rim with linear bearing means interposed between the inner and outer cylinders so that the former can rotate and slide within the latter, a spring interdisposed between the inner and outer cylinders to resist, in compression, the inward movement toward the vehicle of the inner cylinder. Each inner cylinder has a threaded receptacle on one end which receives the lug from the vehicle drum or hub and a drive opening on the other end which receives the drive anvil of an impact wrench, usually one-half (½) inch in size. This eliminates the loss of the lug nuts and because of the outward movement of the inner cylinder facilitates disengagement of the impact wrench.

3 Claims, 2 Drawing Sheets

VEHICLE RIM ASSEMBLY

The present application is a continuation-in-part of application Ser. No. 08/676,715 filed Jul. 8, 1996 and now abandoned.

BACKGROUND OF THE INVENTION

1. Field of the Invention

The present invention relates to the field of automotive wheels, particularly the disc portion hereinafter referred to as vehicle rims. More particularly, it relates to a combination vehicle rim and lug nut assembly to facilitate the removal and remounting of tires on an automobile or similar vehicle wherein the disengagement of an impact type lug wrench normally utilized for such procedures is simplified and accelerated.

2. Field of the Invention

In the field of the present invention, the users of vehicles often have occasion to change a tire and rim with the concurrent problems of loss of lug nuts in some circumstances and the jamming of an impact type or other lug wrench in other circumstances. Nowhere is this more critical than in the field of auto racing wherein the speed of changing of tires and rims has a direct effect on the outcome of many races. Often, an otherwise speedy automotive crew or pit crew as they are often called, is stymied in its efforts to speed a car along its way by the unforeseen jamming of a lug nut inside the socket of an impact wrench. Also, rapid alignment of the rim with its counterpart on the vehicle drum or hub is also a highly desired result.

Spring loading of fasteners has been taught in the art, for example, U.S. Pat. No. 1,919,812, issued to Swanson, discloses a spring loaded member; however, the combination with a series of members in a wheel formation is not taught. U.S. Pat. No. 2,101,938, discloses a pipe joint with a spring loaded member. The use of springs in self-locking fasteners is also taught in U.S. Pat. No. 2,407,314.

U.S. Pat. 2,591,631, issued to Stanitski, utilizes a wheel with nuts placed therein; however, its primary focus is to prevent loosening by vibration.

A vehicle rim which can be quickly mounted and which facilitates the removal of the anvil of the impact wrench from a lug nut is still needed in the art.

It is therefore an object of the present invention to provide a simplified vehicle rim which allows for rapid mounting and removal.

It is a further object of the present invention to provide a combination rim and lug nut assembly which increases the speed of tire changes by pre-aligning the lug nuts in the rim so that rapid connection to the vehicle hub or drum can be accomplished.

It is a further object of the present invention to provide a rim and lug nut assembly which facilitates engagement and disengagement of the anvil of the impact wrench used to tighten the lug nuts so that the occurrence of a jam is greatly lessened and potentially eliminated.

These and other objects and advantages are now achieved by the apparatus of the present invention, which provides a combination wheel rim and lug nut assembly wherein a rim, having an inside and outside face has a series of tubular extensions mounted equidistantly around the circumference of the rim, usually five (5) in number. Mounted in each tubular extension is a two part cylindrical member. The outer cylindrical portion is fixedly mounted to the tubular extension and the inner cylindrical member is free to rotate and slide longitudinally within the outer cylinder. A series of linear bearings facilitate this motion and are interdisposed between the two cylinders. The inner cylinder has an inward end which has an aperture defined along its axis which is threaded to accommodate the lug bolt in the drum or hub and the outward end has a drive opening, usually one-half inch (½"), defined within it to receive the anvil of the impact wrench which can be therein engaged. A helical spring is attached to the inner cylinder and surrounds it. It engages against the inward end of the outer cylinder and, in compression, resists the inward motion of the inner cylinder. In this way, the drive opening end is always forced outwardly thereby facilitating engagement and disengagement of the impact wrench.

In operation, the entire rim is placed against the drum or hub with each lug nut aligned with the lugs in the drum or hub. At this point, all of the drive open ends are forced outwardly for easy access by the impact wrench which, when engaged, draws the lug nut onto the lug and with it the rim, to a firm connection with the drum or hub.

The objects and advantages of the present invention are thereby achieved.

These and other objects and advantages of the apparatus of the present invention will be more clearly apparent upon review of the drawings and the detailed description of the preferred embodiment which follow.

THE DRAWINGS

DETAILED DESCRIPTION

With reference to the drawings, a detailed description of the apparatus of the present invention and the method for utilizing this apparatus follows.

Figure 1:
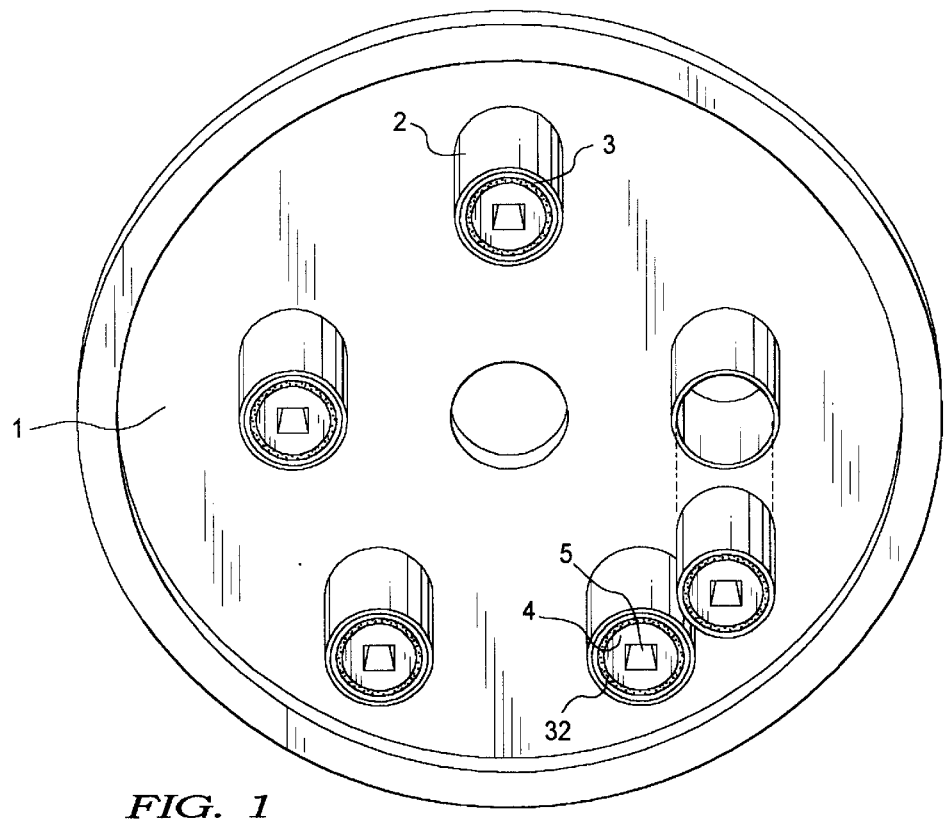
FIG. 1 shows a perspective of the outside face of the rim with the lug assemblies attached.

Referring firstly to FIG. 1 the rim assembly, 1, of the invention is shown from the outside. Placed circumferentially around the rim is a series of equidistantly placed tubular extensions, 2, mounted equidistantly around the circumference of the rim within which the outer cylinder, 3, is fixed. This fixed cylinder can also be seen in FIG. 2 looking from the vehicle side or inside of the rim assembly. Within this cylinder is disposed inner cylinder, 4, which is more readily apparent by viewing FIG. 1. The inner cylinder and outer cylinder are rotationally and slidingly mounted one, 4, within the other, 3. Interdisposed is linear bearing means, 6, with outer wall 61 which facilitates the movement of member, 4, within member, 3. The outer end of member, 4, has defined therein a drive aperture, usually one-half inch (½"), 5, which receives the impact tool wrench (not shown) whereby torque is applied from the wrench via the anvil of the impact tool engaging aperture, 5. The entire inner cylinder, 4, rotates within bearings, 6, relative to outer cylinder, 3. Although the entire inner cylinder, 4, can also rotate as well as slide within the walls of outer cylinder, 3, the bearing, 6, within its outer wall, 61, facilitates rotation in situations where the rotation of, 4, within, 3, is not sufficient due to heat, friction, the presence of grit or other impediments to movement. The inner end, 7, closer to the vehicle, has defined therein interior threads, 8, which engage the stud or lug, 10, and thereby tighten the rim with the tire attached to the drum or wheel hub of the vehicle.

Figure 2:
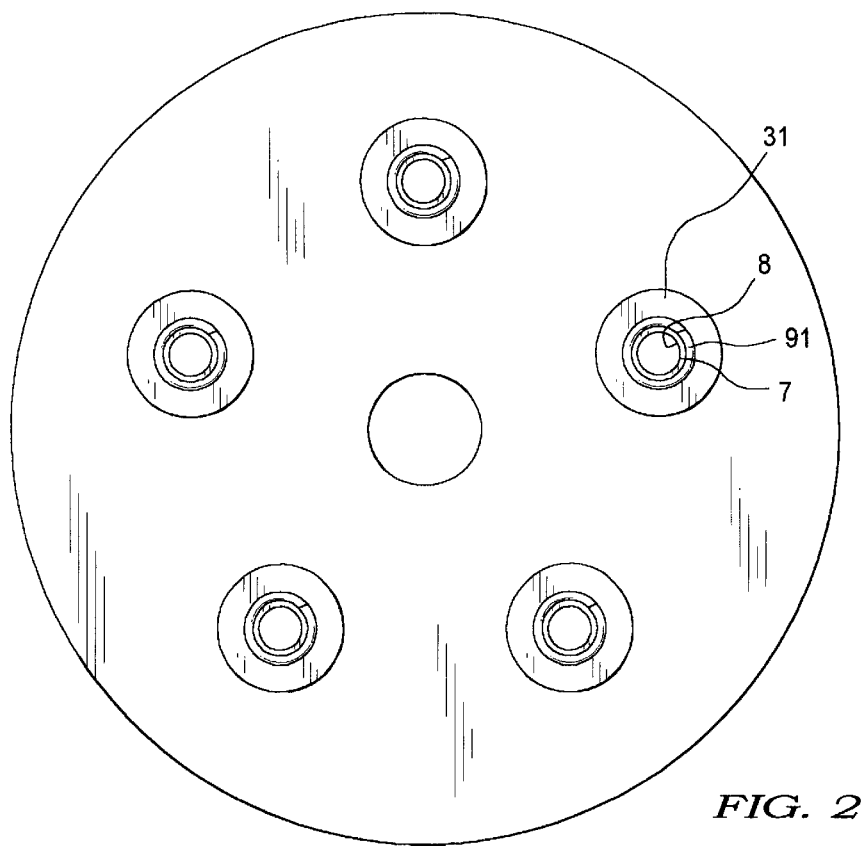
FIG. 2 shows a perspective of the inside face of the rim, illustrative of the threaded end of the lug assemblies.
Figure 3:
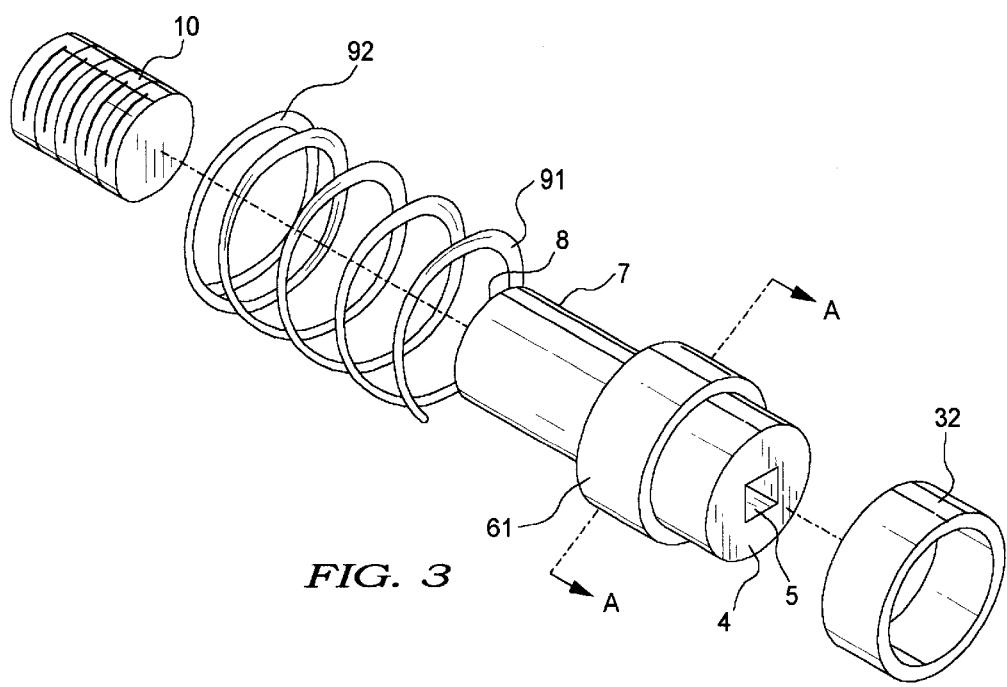
FIG. 3 is an exploded view of the lug shaft and the spring.
Figure 4:
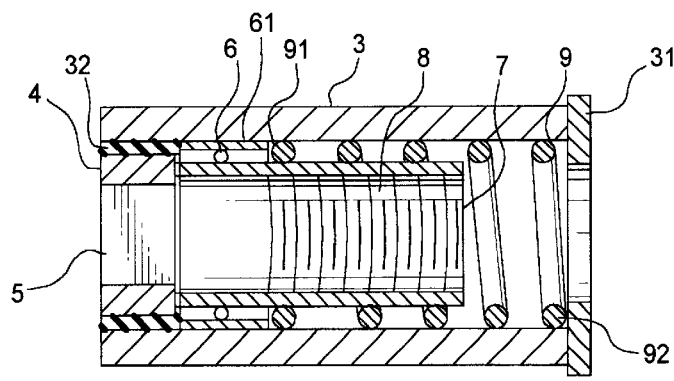
FIG. 4 is a cross section view of the lug nut shaft, spring and bearing means.
Figure 5:
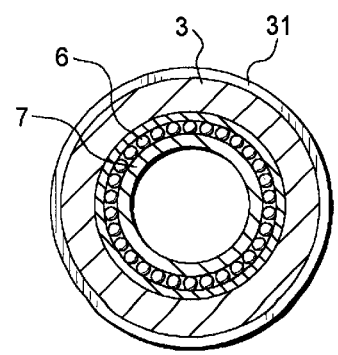
FIG. 5 is a cross-sectional view across the bearing means, 6, of FIG. 3.

Spring, 9, is fixed on one end, 91, to the inner cylinder, 4, at a location adjacent to outer bearing wall, 61 and is free on the other end, 92; however, the free end, 92, is restrained within the outer cylinder by inwardly projecting interior flange, 31, shown on FIGS. 2 and 4 and 5. This spring resists inward motion of the inner cylinder so that the drive aperture, 5, is caused to be disposed at the outer end of outer cylinder, 3. As a result, when the impact wrench or force is removed or lessened, the entire inner cylinder slides outwardly allowing for quick and easy disengagement of the impact wrench anvil.

At the outer end of cylinder, 3, is casing, 32, which is a cap like disposed around the inner circumference of cylinder, 3, forming an interior flange and reducing the diameter thereby restraining the inner cylinder 4 from sliding out completely. This casing, 32, is removable so that inner cylinder, 4, can be removed, serviced or replaced. It is suggested that the casing, 32, be of flexible material such as rubber or plastic or the like.

The diameter of the inner cylinder, 4, is accommodatingly smaller than the inner diameter of the outer cylinder, 3. As a result, pressure on the inner cylinder causes it to slide inwardly so that the threaded end engages beyond the end of the outer cylinder to facilitate engagement of threads, 8, with stud, 10. When the torque applied by the impact wrench, it draws the rim, 1, toward the drum or wheel hub of the vehicle, the inner cylinder gradually moves until the inner end of the outer cylinder, 4, contacts or engages the drum or hub.

The diameter of the inner cylinder and spring at its connection point, 91, however, is larger than the inner diameter of the outer cylinder, 3, at flange location, 31, thereby restraining the inner cylinder and spring from complete disengagement from the outer cylinder.

This same procedure is repeated at each tubular extension location around the rim, 1, so that a firm connection of the rim, which carries the tire, not shown, to the vehicle hub or drum is completed.

When complete engagement is achieved, each stud location has an outwardly facing drive aperture, 5, which is readily accessible for later removal. Further, each aperture, 5, in that it is disposed of the outer end of the outer cylinder, is disengaged from the impact wrench quickly and efficiently. Jams are therefore eliminated which might otherwise occur in the conventional wheel/rim assembly. Further, marring of the lug nuts which are often chrome-plated, is eliminated by reducing the jamming which often otherwise occurs.

Although the within contained detailed description describes the preferred embodiment of the invention, it is anticipated that modifications and variations can be made which do not vary from the scope and spirit of the invention set forth in the following claims.

What is claimed is:

1. A vehicle wheel rim and lug nut apparatus to be mounted on a vehicle wheel hub with fixed lugs which comprises:

a. a vehicle rim with an inward face and an outward face;

b. a series of tubular extensions mounted equidistantly around the circumference of the rim;

c. a series of fixed cylinders securely mounted within each tubular extension, each fixed cylinder having an interior flange on the inner circumference of the end of the fixed cylinder adjacent to the inward face of the vehicle rim;

d. a series of inner cylinders each positioned within each fixed cylinder and each comprising an inward end and an outward end wherein the inward end has defined therein a threaded aperture to accommodate the hub lugs and wherein the outward end has a drive aperture defined therein to receive an impact wrench anvil;

e. means for restraining the outward sliding motion of the inner cylinder, said means disposed circumferentially within the outward end of the outer cylinder;

f. a series of linear bearings interdisposed between the inner cylinders and the fixed cylinders;

g. a series of helical springs fixedly mounted to the inner cylinder on one end and engaging the interior flange of the fixed cylinder on the other end exerting tension to resist inward force on the inner cylinder whereby the apparatus can be mounted on the vehicle wheel by alignment and engagement of the series of inner cylinder threaded apertures with the lugs on the vehicle wheel hub.

2. The apparatus of claim 1 wherein the means of step e comprises a removable casing of flexible material removal of which allows the entire inner cylinder to be removed from the outer cylinder.

3. The apparatus of claim 2 herein the tubular extensions are five (5) in number and the drive aperture is a square configuration with one-half inch (½") sides.

* * * * *